United States Patent [19]

Ledeen et al.

[11] 4,051,715

[45] Oct. 4, 1977

[54] LINEBREAK DETECTION SYSTEM

[75] Inventors: Howard L. Ledeen, Pasadena; Franz Schmon, Granada Hills, both of Calif.

[73] Assignee: Ledeen Flow Control Systems, Sun Valley, Calif.

[21] Appl. No.: 718,757

[22] Filed: Aug. 30, 1976

[51] Int. Cl.² .......................................... G01M 3/28
[52] U.S. Cl. .................................. 73/40.5 R; 137/12; 137/456
[58] Field of Search ............... 73/40, 40.5 R; 116/70; 137/12, 14, 456, 557

[56] References Cited

U.S. PATENT DOCUMENTS

| | | | |
|---|---|---|---|
| 3,612,081 | 10/1971 | Williams | 137/12 |
| 3,665,945 | 5/1972 | Uttenstein | 137/14 |
| 3,884,077 | 5/1975 | Athy, Jr. | 73/40.5 R X |

*Primary Examiner*—Charles A. Ruehl
*Attorney, Agent, or Firm*—Melvin R. Stidham

[57] ABSTRACT

A pipeline break detection system wherein a rate timer valve is opened in response to a predetermined pressure drop to direct pressure fluid to activate the time cycle of an on-delay valve and, itself commence a time delay closing cycle. If its closing countdown continues to completion, it depressurizes the on-delay output valve and cancels its countdown. However, if the pipeline experiences a further like pressure drop, before the rate timer valve closes, it will be recharged and held open to keep the output valve timer actuated. If the pipeline pressure fails to level off to allow the rate timer valve to close, and the output relay is thus enabled to complete its timed cycle, the output relay opens to deliver a fluid signal.

11 Claims, 5 Drawing Figures

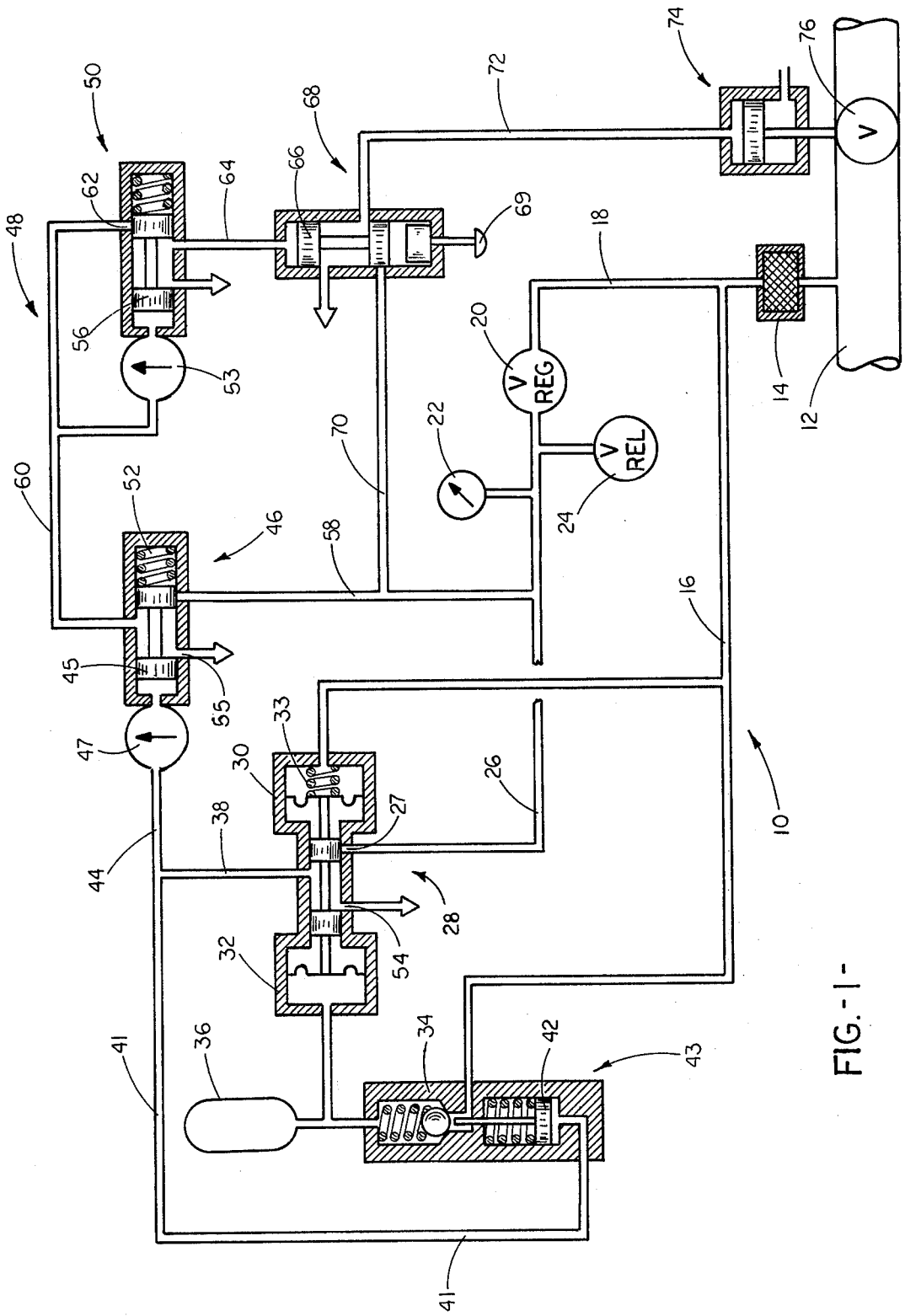
FIG.-1-

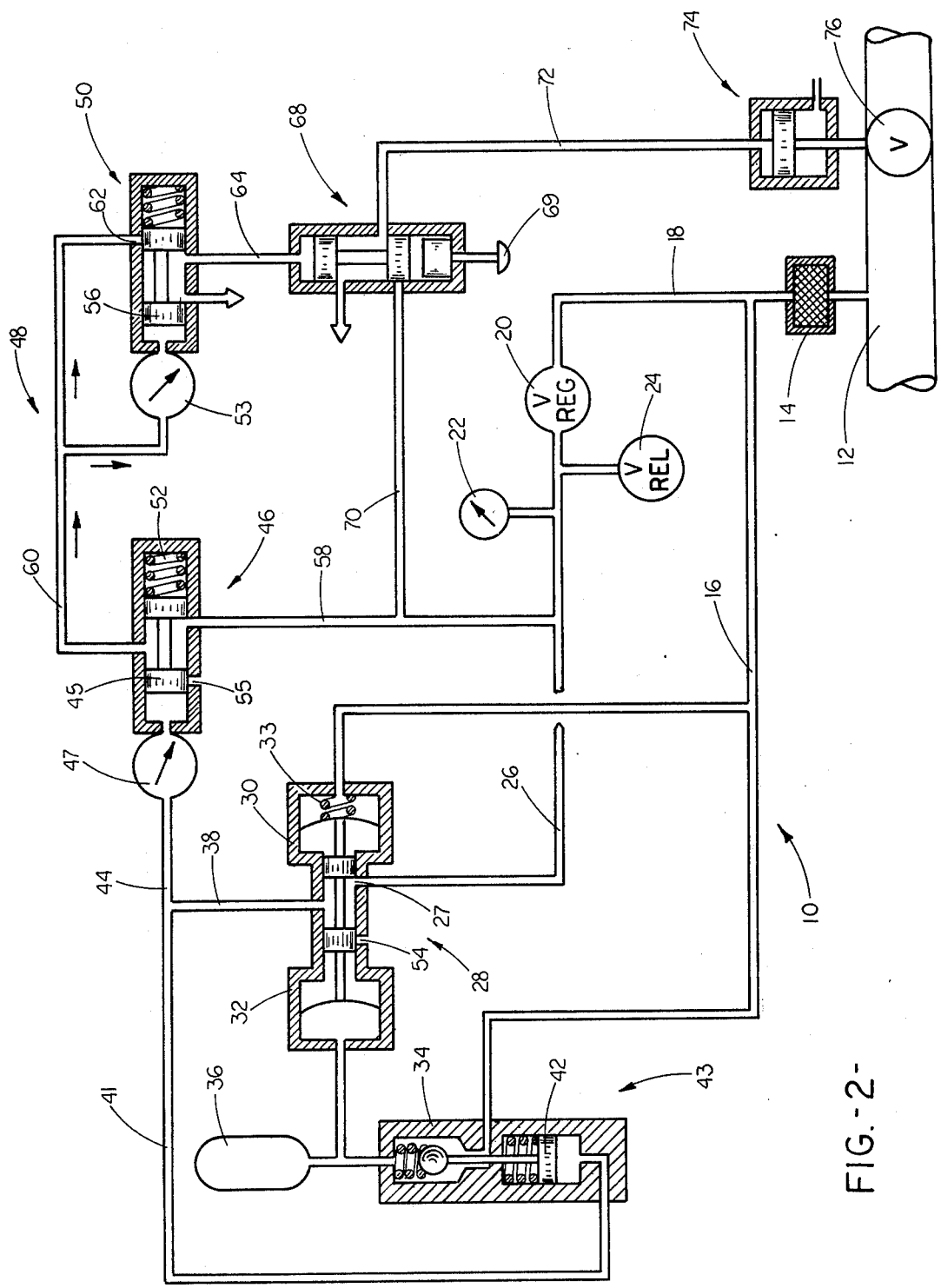
FIG.-2-

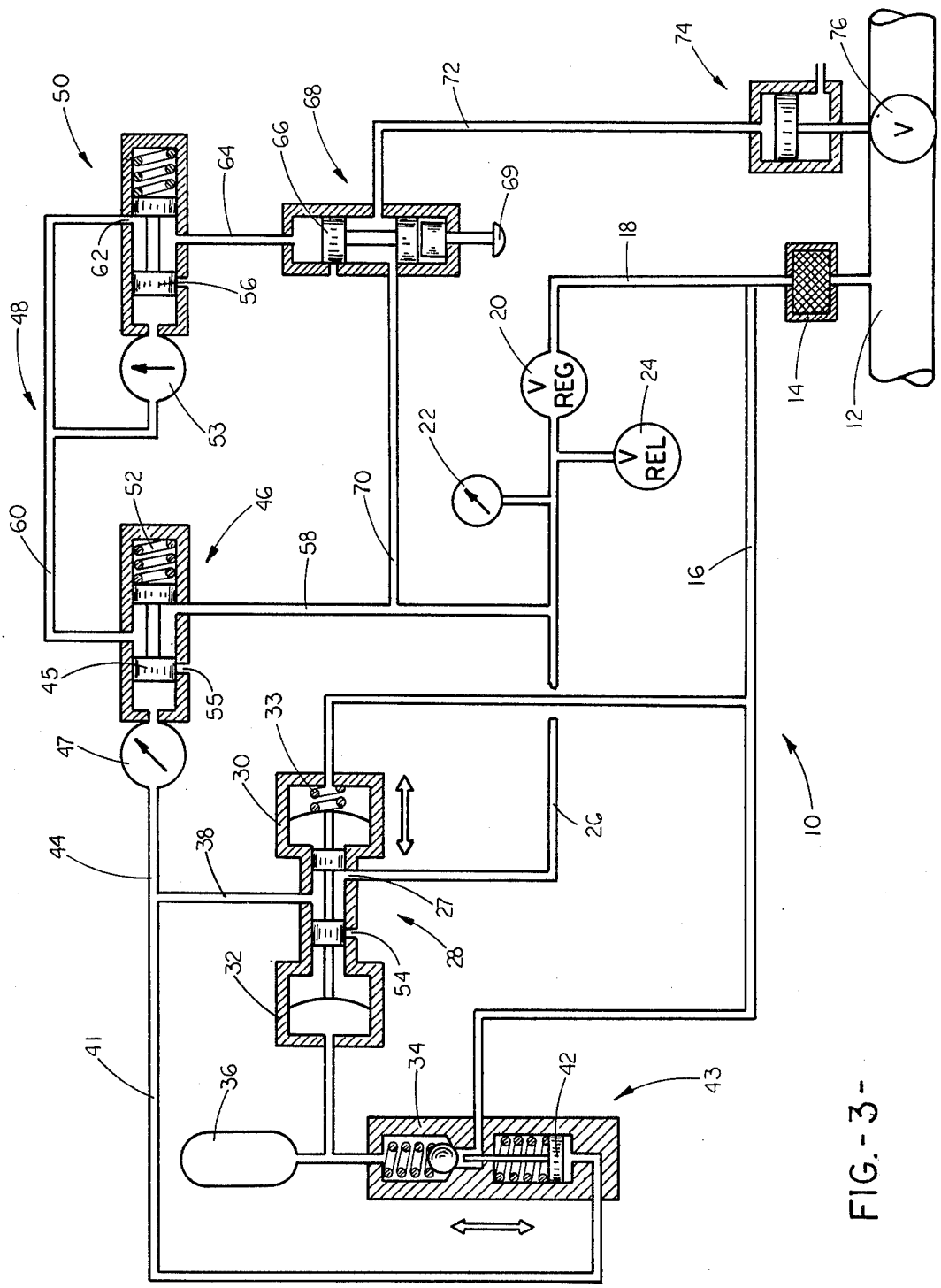
FIG.-3-

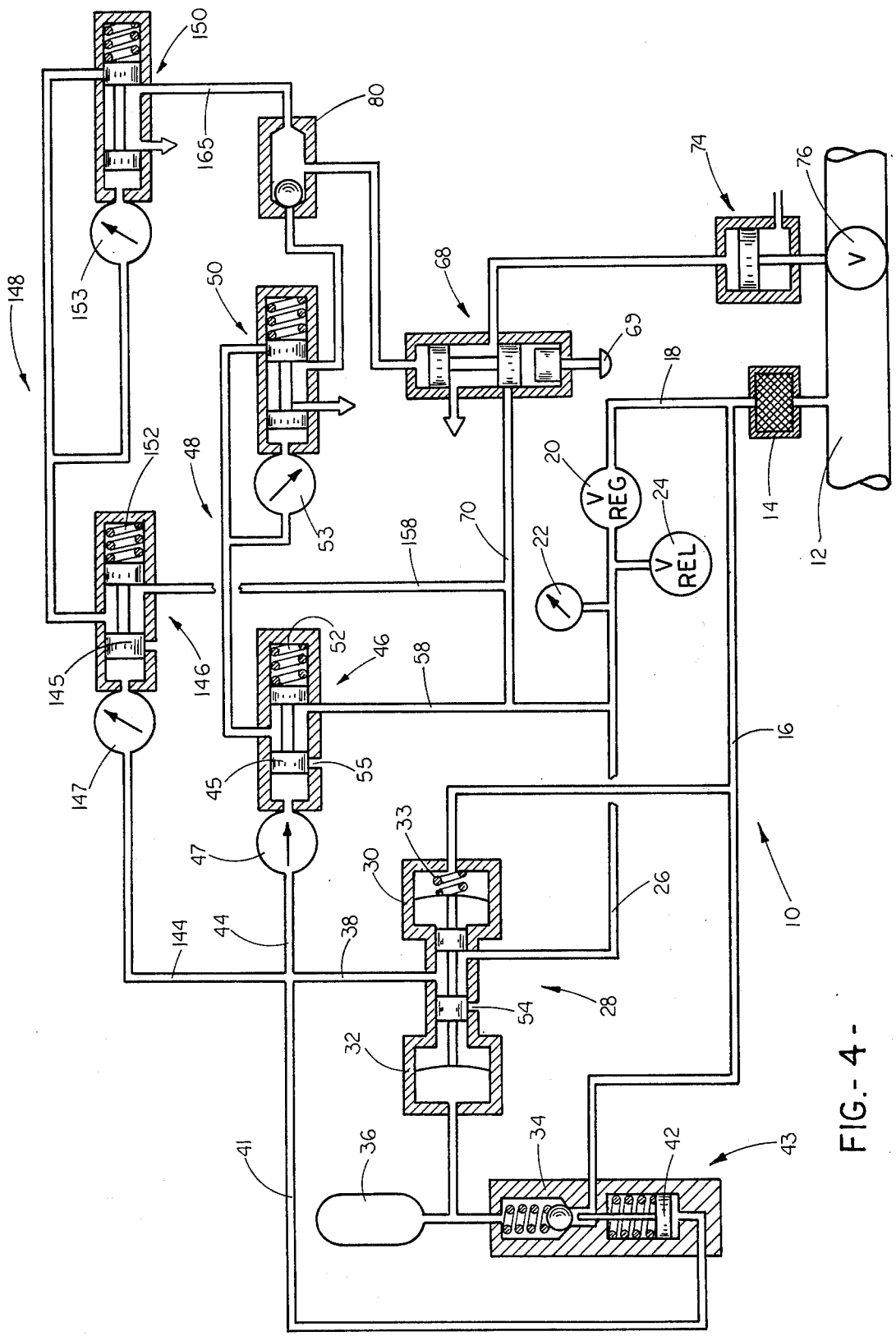
FIG.-4.-

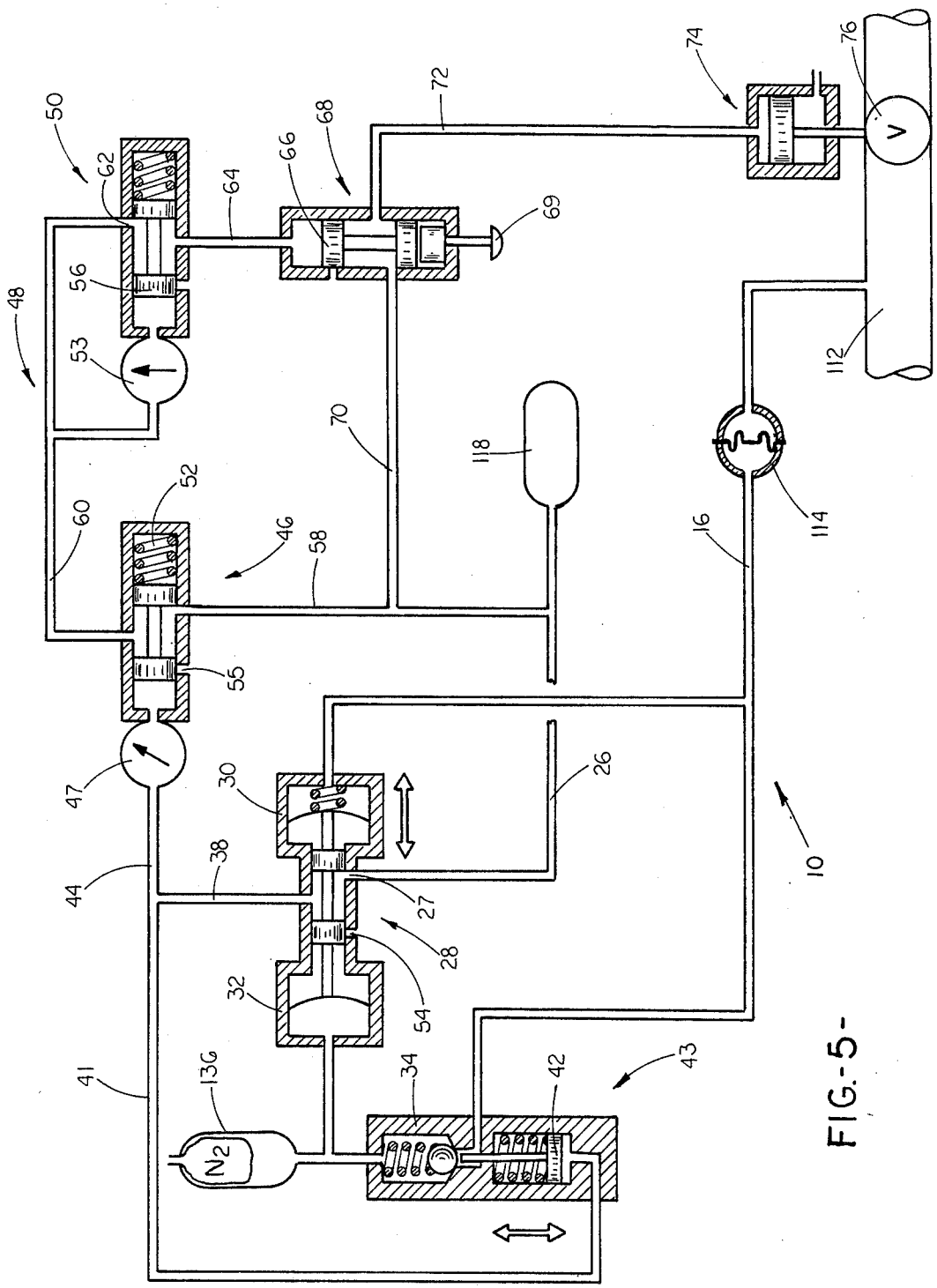
FIG.-5-

LINEBREAK DETECTION SYSTEM

BACKGROUND OF THE INVENTION

This invention relates to a pipeline break detection system and, more particularly, to a system for monitoring the rate at which pressure in a pipeline falls. Previous pipeline break detector systems delivered an output signal in the system. However, such break detection systems were generally extremely complex with numberous high quality components and extensive plumbing or they could not distinguish a fast, short term surge from an actual linebreak, and often required an external power source.

OBJECTS OF THE INVENTION

It is an object of this invention to provide a system for monitoring the rate at which pipeline pressure drops, and to deliver a fluid signal in the event that rate exceeds a predetermined level.

It is a further object of this invention to provide a pressure rate monitoring system wherein a timing cycle is initiated by a predetermined pressure drop to deliver a fluid signal should a like pressure drop occur within the timed cycle.

It is a further object of this invention to provide a pressure rate monitoring system which delivers a fluid signal in the event of a predetermined pressure drop in a predetermined time period, indicative of a line break.

It is a further object of this invention to provide a line break detection system which delivers a delayed output signal in response to a pressure drop which delay insures that the output signal will be activated only if the pressure drop continues for a timed period.

It is a further object of this invention to provide a pipeline break detection system that operates on existing pipeline pressure without requirement of externally supplied power or electricity.

Other objects and advantages of this invention will become apparent from the description to follow when read in conjunction with the accompanying drawings.

SUMMARY OF THE INVENTION

In carrying out this invention, I provide a timed relay system including an output relay which opens after a predetermined time delay to deliver a fluid signal to close a valve, trigger an alarm or the like. A rate timer relay, when charged, delivers system pressure fluid to the output relay, both to charge it and to be available for passage thereby. At the same time it triggers the output relay time delay, the rate timer relay itself starts a timed closing countdown, which if completed, relieves and inactivates the output relay. The rate timer relay is charged and opened in response to a fluid signal delivered from a differential relay, which, in turn, opens in response to a predetermined pipeline pressure drop and then closes again. If a like further pressure drop occurs, the differential relay opens again to charge the rate timer, and this cycling continues as long as the pipeline pressure falls. If the subsequent openings of the differential relay valve occurs before the time delay closing of the rate timer valve occurs, the rate timer simply stays open and a complete new countdown cycle is initiated. As long as the rate timer is not allowed to return to its closed position by reason of a continuing pressure drop, the output relay will not be relieved, and its countdown to opening movement continues. If the output relay completes its timed cycle, it delivers its pressure signal to close a valve, sound an alarm or the like.

If, on the other hand, pipeline pressure does not fall a like amount prior to completion of the rate timer countdown, it will shift back to its closed position, wherein it vents the output relay and aborts its countdown, returning the entire system to null status, ready to respond to further pressure drops.

BRIEF DESCRIPTION OF THE DRAWINGS

In the drawings:

FIGS. 1 to 3 are schematic diagrams of an embodiment of this invention in various stages of operation;

FIG. 4 is a schematic diagram of another embodiment of this invention; and

FIG. 5 is a schematic diagram of still another embodiment of this invention.

DESCRIPTION OF PREFERRED EMBODIMENTS

The Embodiment of FIGS. 1 to 3

Referring now to FIGS. 1 and 2 with greater particularity, the system 10 of this invention is shown in conjunction with a pipeline 12 for transmission of gas, which may be passed through a filter 14 and then directed separately to a differential relay pilot line 16 and a timed cycle relay system line 18.

In the timed cycle relay system line 18, the pressure may be reduced at regulator 20 to a desired control pressure of, say 40 to 100 psi. A gauge 22 may be provided to monitor the system pressure, and a relief valve 24 is provided to vent excess pressure and keep it in the desired range in the event of a failure in the regulator 20. In any event, the system's gas, as so regulated, is directed through line 26 to a normally closed port 27 of a differential relay valve 28.

In the absence of a pressure drop, the differential relay pilot line 16 maintains the low pressure pilot 30 and the high pressure pilot 32 (both shown as diaphram controls) of the differential relay valve 28 continuously under the pressure of the pipeline 12. Hence, under normal conditions, the differential relay valve 28 will be in pressure balance, and biased by a spring 33 to remain in the closed position shown in FIG. 1 with port 27 shut off. Flow of the gas at pipeline pressure through pilot line 16 to the high pressure pilot 32 is through a check valve 34, which communicates also with a volume tank 36. In the event of a drop in pressure in the pipeline pilot line 16, as in the event of a pipeline break, flow from the high pressure pilot 32 and the volume tank 36 is prevented by the check valve 34. Hence the fluid asserted against pilot 32 is trapped at the previous pressure level of the pipeline pilot line 16, while that asserted against the low pressure pilot 30 falls off to the newly existing level of the pilot line 16. Should this pressure differential between pilots 32 and 30 be sufficient to overcome the spring 33, say 10 psi, the differential relay 28 will shift to the position shown in FIG. 2, enabling flow to differential valve outlet line 38.

When the differential relay 28 is so opened, the relay system gas from outlet duct 38 flows simultaneously through line 41 to the pilot 42 of the check valve 34 and through line 44 to the pilot 45 of a rate timer relay or valve 46. The rate timer relay forms part of a time delay control system 48, which also includes an output timer relay 50. The rate timer relay 46 is of the off-delay type while the output timer relay 50 is of the on-delay type.

That is, a timing mechanism 47 in rate timer valve 46 is set by pressure asserted at the pilot 45 as indicated in FIG. 2 and, at the instant that pilot pressure is relieved through port 54 of the differential relay 28, as shown in FIG. 1, it commences its countdown to release a valve-closing spring 52. In the output relay 50, the timing mechanism 53 is initiated by pressure asserted at the pilot 56 when the rate timer relay 46 opens the system line 58 to line 60, and its countdown continues to completion as long as so pressurized. If the countdown of timer 53 is completed, the output valve 50 opens to enable flow through outlet passage 64, but if the pressure at pilot 56 is relieved, the countdown timer 53 is cancelled.

When the differential relay 28 is shifted to the open position shown in FIG. 2 both the rate timer relay 46 and the pilot operated check valve 34 are shifted to their open positions. Hence, the rate timer valve 46 is opened to actuate the output relay timer mechanism 53 and the check valve 34 opens by action of the pilot 42, to relieve the high pressure pilot 32 and volume tank 36 to the reduced level of the pilot line 16, i.e., that of the low pressure pilot 30. With the high and low pressure pilots 32 and 30 again in balance, the spring 33 shifts the differential relay 28 back to the position shown in FIG. 1 wherein the pilot 45 of rate timer 46 and the pilot 42 of check valve 34 are relieved at port 54 of differential relay 28, to allow check valve 34 to close and the rate timer 47 to commence its off-delay countdown, which if completed, allows the spring 52 to shift the rate timer relay 46 back to its initial position shown in FIG. 1 relieving the output relay pilot 56 at vent 55.

If the output relay 50 is able to complete its timed cycle before it is vented and cancelled by the delayed return of the rate timer 46 to its FIG. 1 position, the output relay 50 shifts to open position shown in FIG. 3 to enable flow at normally closed port 62 and through line 64 to the pilot 66 of an output valve 68, which in turn delivers a system pressure signal from lines 18, 58 and 70 to output line 72. Such fluid signal may be employed to activate a valve operator 74 to close a valve in the pipeline 12, or to otherwise initiate steps to minimize damage from the break. Once the output valve 68 has been piloted to its open position, it maintains its output pressure signal until it is manually reset at 69 to the originally closed position, independent of the actions of the timers.

Summarizing the operation of the system 10, the differential valve 28 opens with every fixed increment of pressure drop of an amount to enable the high pressure pilot 32 to overcome the spring 33. This enables flow of system pressure fluid from line 26 to lines 44 and 41 to open the rate timer relay 46 and the check valve 34, respectively. Opening the check valve 34 relieves the high pressure pilot 32, closing the differential valve 28 which vents the rate timer pilot 45 whereby the timer 47 commences its countdown to closed position. If another fixed pressure drop increment is reached before such countdown is completed the differential valve opens again to recharge the rate timer, which when again relieved through differential valve vent 54, starts a new countdown cycle.

When the rate timer relay 46 is first opened, it charges the output relay 50 to start is countdown to open. Hence, if the rate timer relay 46 is held open by continued pipeline pressure drops which keep the differential valve 28 cycling as described, the output relay timer may have an opportunity to complete its countdown and move to the open position shown in FIG. 3 wherein the fluid signal is delivered.

As long as the pipeline pressure continues to fall as in a line break, the differential relay valve 28 and the pilot operated check valve 34 will continue to cycle as indicated by the double arrows in FIG. 3 and, assuming a cycle time less than that determined for line break criteria, the rate timer relay 46 will simply be held open until the on-delay output relay is shifted to the position shown in FIG. 3 wherein system pressure flows through it to the pilot 66 of the three way valve 68, and system pressure fluid flows through the lines 70 and 72 to deliver an output signal at 74. This could be used to operate a valve actuator 74 to close off a valve 76. The three way valve 68 is reset manually in order to cancel the line-break signal.

Since the setting of the time period ($T_r$) for the rate timer 47 as well as that ($T_o$) for the output timer 53 are the only adjustments required in the system, it is important to relate pressure factors to time for both timers. For example, the rate timer 47 is set in accordance with the following equation:

$$T_r y32\ 60 \times (\Delta P/R_C)$$

where:

$T_r$ (in seconds) is the time setting of the rate timer 47;

$\Delta P$ is the pressure differential which will overcome the spring 33 to shift the differential relay valve 28. As described previously, this pressure differential has been selected at 10 psi; and $R_C$ (psi/min.) is the accepted "criterion" rate of pressure drop in the pipeline which has been predetermined to correspond to a line break. This may also be expressed ($\Delta P/\Delta T_r$).

The factor 60 is introduced into the equation to convert the psi per minute factor to seconds as needed for the timer setting.

Using the above equation, suppose it is desired to receive a line break signal if the pressure in the pipeline drops at least 20 psi per minute, i.e., $R_C = 20$. Then:

$$T_r = (60 \times 10\ /20) = 30\ \text{seconds}$$

$T_r$ is the time required to drop the pressure $\Delta P$ at a rate of $R_C$ and, in the example shown, 30 seconds is time required to drop the pressure 10 psi at the rate of 20 psi per minute. If the rate timer 47 is set at 30 seconds, any rate larger than 20 psi per minute will recharge the timer for a new timing cycle $T_r$ before completion of the cycle in which it is engaged. Therefore, the rate timer relay 46 will continue to supply pressure to the pilot 56 of the on-delay output relay 50 which is still making its countdown $T_o$. The output timer 53 should be set to exceed the rate time 47 by at least several seconds, e.g., 10 seconds. Hence, in the example above, the output timer 53 should be set at 40 seconds. With these setting $T_r$ and $T_o$ for the rate timer 47 and the output timer 53, respectively, any rate of pressure drop exceeding 20 psi per minute will result in an output signal being delivered through line 64 from output relay 50 exactly 40 seconds after the start of the output timer cycle $T_o$.

In the pipeline applications wherein large pressure transients may occur, as is often the case in liquid product pipelines, it may be desirable to allow for multiple confirmation of the rate of pressure drop before a final output signal is provided. This can prevent premature response to a rate change which may last just long enough to fulfill the one cycle rate condition but then might recover. To provide such multiple confirmation, the output timer 53 maybe set at 2, 3 or 4 times $T_r$, depending on the number of repeat check cycles desired. For multiple confirmations, each individual cycle must equal or exceed the rate for which the rate timer 47 is adjusted. If any one of the multiple confirmation cycles measures a rate below the criterion rate, the rate timer relay 46 will return to the position shown in FIG. 1 to vent the pilot 56 of the output relay 50 and reset to a new start of multiple confirmation checks.

THE EMBODIMENT OF FIG. 4

It may be desirable to respond to a catastrophic pressure drop immediately in order to protect lives and property and to minimize contamination of the environment, but to react more slowly to a pressure drop, which may merely be symptomatic of an acceptable pressure transient, or even a partial break or one a considerable distance from the detector and not intended to be sensed. This can be accomplished by the provision of two independent pressure drop rate timing assemblies 48 and 148, as shown in FIG. 4. There, the output line 38 from the differential relay valve 28 is connected to lines 44 and 144 to charge the pilots 45 and 145 of slow and rapid rate timers 46 and 146, respectively. Hence, both rate timer relays 46 and 146 are shifted to open positions to commence actuation of output relay timers 53 and 153. Simultaneously, the pilot 42 of a pilot-operated bypass check valve 43 is opened whereby the differential valve 28 is shifted back and the rate timer pilots 45 and 145 are vented through differential valve vent 54. This initiates countdown operations of the timing mechanisms 47 and 147 of the rate timer relays 46 and 146, concurrently with the on-delay timers 53 and 153 of the output relays 50 and 150. However, the prompt acting relay timers 147 and 153 are set for a shorter delay, say 15 seconds, so that if the differential relay 28 shifts back again within that time, such as might occur in a catastrophic break, the rapid rate timer relay 146 will be held open to allow its output relay 150 to deliver a fluid signal at 165. A shuttle valve 80 is provided to prevent reverse flow from line 165 to normal output relay 50.

THE EMBODIMENT OF FIG. 5

Where the system of this invention is installed to monitor a liquid pipeline, a separate gas source 118 may be provided in place of the system line 18 and a liquid-gas accumulator 136 is substituted for the volume tank 36, to provide for volumetric change in fluid during shifting of relay valve 28, since liquid is non-compressible. If the liquid in the pipeline is extremely contaminated or corrosive a bladder or diaphragm type separator 114 may be provided to transmit the pressure from the pipeline 112 to a clean hydraulic fluid in the $\Delta P$ pilot line 16, completely sealed from the environment.

While this invention has been described in conjunction with preferred embodiments thereof, it is obvious that modifications and changes therein may be made by those skilled in the art without departing from the spirit and scope of this invention, as defined by the Claims appended hereto.

It is to be understood that the pneumatically operated timers and control valves of the embodiments described may be replaced by electrical or solid state electronic devices. In such case, the output signal will be obtained through a closing or opening of an electric switch, which connects or breaks a control signal.

What is claimed as invention is:

1. A pipeline pressure drop monitoring system comprising:
    means for transmitting an actuating signal in response to each decrease in pipeline pressure of a given increment;
    timing means activated by receipt of an actuating signal to deliver an energizing signal for a predetermined period; and
    output means conditioned while a said energizing signal is imposed thereon to deliver an action signal after a timed delay longer than said predetermined period;
    said output means comprising:
    a pressure fluid system; and
    an on-delay output valve in said fluid system.

2. The pipeline pressure drop monitoring system defined by claim 1 wherein said timing means comprises:
    an off-delay timer valve in said fluid system conditioned to be held open for said predetermined period in response to each receipt thereby and then relief of an actuating signal;
    the outlet of said timer valve being connected to actuate said output means.

3. The pipeline pressure drop monitoring system defined by claim 2 wherein said:
    on-delay output valve is pilot-operated;
    the outlet of said timer valve being connected to the pilot of said output valve.

4. The pipeline pressure drop monitoring system defined by claim 3 wherein:
    said timer valve includes a pilot operative in response to each receipt thereby of an actuating signal to open said timer valve and to condition a timing mechanism to time a said predetermined period;
    said timer valve timing mechanism being initiated by interruption of said actuating signal; and
    said on-delay output valve includes an operator operative in response to fluid pressure to initiate a timing mechanism;
    said output valve timing mechanism being reset by relief of pressure asserted on said operator;
    said operator being relieved through said timer valve in off position.

5. The pipeline pressure drop monitoring system defined by claim 4 wherein:
    said output valve timing mechanism is set to hold said output valve closed for a time slightly longer than said predetermined period.

6. The pipeline pressure drop monitoring system defined by claim 4 wherein:
    said output valve timing mechanism is set to hold said output valve closed longer than at least two of said predetermined periods.

7. The pipeline pressure drop monitoring system defined by claim 2 wherein said actuating signal transmitting means comprises:
    a differential valve in said fluid system conditioned to open momentarily in response to each said pipeline pressure decrease;
    the outlet of said differential valve being connected to an operator on said timer valve.

8. The pipeline pressure drop monitoring system defined by claim 7 wherein:
    said differential valve is movable between a first position, wherein it blocks flow through said fluid system and relieves the operator of said timer valve, and a second open position;

first and second pilot lines connecting said pipeline to opposite sides of said differential valve to bias same toward said first and second positions, respectively;

means delivering a preset force corresponding to said given increment of pipeline pressure to bias said differential valve to said first position; and a check valve preventing reverse flow in said second pilot line.

9. The pipeline pressure drop monitoring system defined by claim 8 including:

pilot operated means for rendering said check valve ineffective;

the outlet of said differential valve being also connected to said pilot operated means.

10. The pipeline pressure drop monitoring system defined by claim 2 including:

a second off-delay timer valve in said fluid system conditioned to be held open in response to each receipt thereby of an actuating signal for a short time less than said predetermined period; and second output means conditioned while pressure fluid is imposed thereon to deliver an action signal after a timed delay slightly longer than said short time.

11. The pipeline pressure drop monitoring system defined by claim 10 wherein said second output means comprises:

a second pilot-operated, on-delay valve;

the outlet of said second timer valve being connected to the pilot of said second on-delay valve.

* * * * *